(12) United States Patent
Yamashita et al.

(10) Patent No.: US 11,473,580 B2
(45) Date of Patent: Oct. 18, 2022

(54) ELECTRIC COMPRESSOR

(71) Applicant: KABUSHIKI KAISHA TOYOTA JIDOSHOKKI, Kariya (JP)

(72) Inventors: Takuro Yamashita, Aichi-ken (JP); Yuya Hattori, Aichi-ken (JP); Takumi Maeda, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 147 days.

(21) Appl. No.: 16/997,267

(22) Filed: Aug. 19, 2020

(65) Prior Publication Data

US 2021/0062811 A1 Mar. 4, 2021

(30) Foreign Application Priority Data

Aug. 30, 2019 (JP) .............................. JP2019-157608

(51) Int. Cl.
*F04C 23/02* (2006.01)
*F04C 18/02* (2006.01)
(Continued)

(52) U.S. Cl.
CPC .......... *F04C 23/02* (2013.01); *F04C 18/0215* (2013.01); *F04C 23/008* (2013.01);
(Continued)

(58) Field of Classification Search
CPC .... F04C 23/02; F04C 23/008; F04C 18/0215; F04C 2240/40; F04C 2240/807; H02K 7/04

See application file for complete search history.

(56) References Cited

U.S. PATENT DOCUMENTS 2,228,364 A * 1/1941 Philipp ................. F25B 31/006
62/505
4,592,703 A * 6/1986 Inaba .................... F04C 29/023
417/372
(Continued)

FOREIGN PATENT DOCUMENTS

JP 2005-140064 A 6/2005
JP 2012-52490 A 3/2012
(Continued)

OTHER PUBLICATIONS

Communication dated Oct. 6, 2021 from the Korean Intellectual Property Office in Application No. 10-2020-0108195.
(Continued)

*Primary Examiner* — Christopher S Bobish
(74) *Attorney, Agent, or Firm* — Sughrue Mion, PLLC

(57) ABSTRACT

An electric compressor includes a housing, a drive shaft, a motor, a movable scroll, and a fixed block. The fixed block is fixed to the housing and disposed between the motor and the movable scroll. The motor includes a stator and a rotor. The rotor has an introduction passage that is formed through the rotor in an axial direction of the drive shaft. The drive shaft includes a balance weight that is disposed between the fixed block and the motor and extends to a position where the balance weight covers at least a part of the introduction passage in a radial direction of the drive shaft in a view in the axial direction. The introduction passage includes a first passage located outward of the balance weight in a circumferential direction of the rotor and the drive shaft, and a second passage facing the balance weight in the axial direction.

3 Claims, 5 Drawing Sheets

(51) Int. Cl.
*F04C 29/00* (2006.01)
*H02K 7/04* (2006.01)
*F04C 23/00* (2006.01)

(52) U.S. Cl.
CPC ........... *F04C 29/0021* (2013.01); *H02K 7/04* (2013.01); *F04C 2240/40* (2013.01); *F04C 2240/807* (2013.01)

(56) References Cited

U.S. PATENT DOCUMENTS

| | | | | |
|---|---|---|---|---|
| 6,247,907 | B1* | 6/2001 | Williams | F04C 23/008 417/410.5 |
| 6,305,914 | B1* | 10/2001 | Lifson | F04C 18/0215 418/94 |
| 8,215,926 | B2* | 7/2012 | Fields | F04C 29/045 310/63 |
| 10,954,944 | B2* | 3/2021 | Seibel | F04C 29/0085 |
| 2004/0179967 | A1* | 9/2004 | Morozumi | F04C 18/0215 418/101 |
| 2008/0175738 | A1* | 7/2008 | Jung | F04C 18/0215 418/55.6 |
| 2008/0304994 | A1* | 12/2008 | Ohtahara | F04C 27/007 418/55.6 |
| 2014/0134014 | A1 | 5/2014 | Mera et al. | |
| 2015/0354572 | A1* | 12/2015 | Yokoyama | F04B 39/0246 418/55.6 |
| 2016/0040672 | A1* | 2/2016 | Lee | F04C 29/026 417/410.5 |
| 2018/0223850 | A1 | 8/2018 | Toyama | |
| 2020/0088195 | A1* | 3/2020 | Yoo | F04C 29/0021 |
| 2020/0291940 | A1* | 9/2020 | Stephens | F04C 18/0215 |

FOREIGN PATENT DOCUMENTS

| | | |
|---|---|---|
| KR | 10-2014-0063432 A | 5/2014 |
| WO | 2017150693 A1 | 9/2017 |
| WO | 2017163814 A1 | 9/2017 |

OTHER PUBLICATIONS

Communication dated Apr. 30, 2021 by the Indian Patent Office in application No. 202044035899.

* cited by examiner

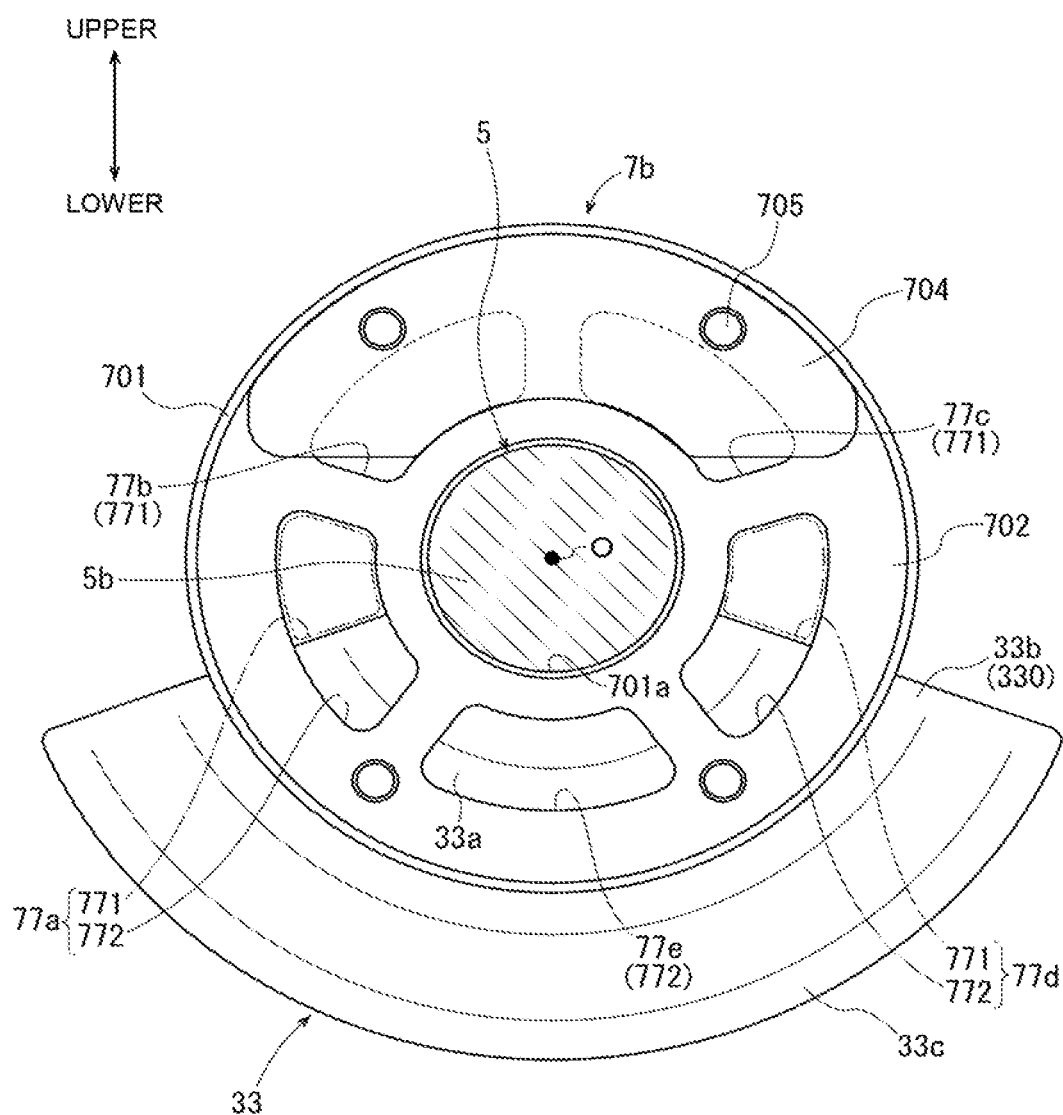

ELECTRIC COMPRESSOR

This application claims priority to Japanese Patent Application No. 2019-157608 filed on Aug. 30, 2019, the entire disclosure of which is incorporated herein by reference.

The present disclosure relates to an electric compressor.

BACKGROUND ART

Japanese Patent Application Publication No. 2005-140064 discloses a known electric compressor (hereinafter simply referred to as a compressor). This compressor includes a housing, a drive shaft, a motor, a fixed scroll, a movable scroll, and a fixed block.

The drive shaft is disposed in the housing, and is rotatable around an axis of the drive shaft. The motor is disposed in the housing, and rotates the drive shaft. The fixed scroll is fixed to the housing, and is disposed in the housing. The movable scroll is disposed in the housing and connected to the drive shaft. The movable scroll is engaged with the fixed scroll, and a compression chamber is formed between the movable scroll and the fixed scroll. The fixed block is fixed to the housing and disposed between the movable scroll and the motor. The fixed block supports the drive shaft such that the drive shaft is rotatable, and defines, in the housing, a motor chamber for accommodating the motor.

Specifically, the housing has an inlet through which refrigerant is dram into the compression chamber from outside of the electric compressor. The motor includes a stator and a rotor. The stator is fixed to an inner wall surface of the housing, so that the stator is fixed in the motor chamber. The rotor is fixed to the drive shaft and disposed in the stator such that the rotor is rotatable together with the drive shaft.

Further, in this compressor, a balance weight is disposed on the drive shaft. The balance weight is disposed between the fixed block and the rotor, that is, in the motor chamber. The balance weight extends in a radial direction of the drive shaft and away from the axis of the drive shaft. Specifically, the balance weight extends to a position where the balance weight covers the rotor in the radial direction of the drive shaft, and the balance weight faces the rotor.

In this compressor, the motor rotates the drive shaft. Rotation of the drive shaft causes the movable scroll to revolve, so that the refrigerant drawn into the compression chamber through the inlet is compressed. In this compressor, the rotating drive shaft receives centrifugal force that is generated by the balance weight. This reduces runout of the drive shaft in a direction intersecting with the axis of the drive shaft while the compressor is in operation.

While the above-described known compressor is in operation, the motor, particularly, the stator generates heat a lot, which may decrease the durability of the compressor. To solve this problem, the housing may have an inlet at a position where the inlet is allowed to communicate with the motor chamber and the fixed block may have a suction passage through which the motor chamber communicates with the compression chamber so that the refrigerant drawn into the motor chamber through the inlet cools the stator.

On the other hand, the compressor needs to be compact so that the compressor can be mounted easily to a vehicle or the like. The housing therefore needs to be compact, but this makes it difficult for an introduction passage through which the refrigerant flows between the housing and the stator, that is, through which the refrigerant flows radially outward of the stator, to be formed in the motor chamber.

To solve this problem, the rotor may have an introduction passage that extends in the axial direction of the drive shaft. However, in this compressor, the balance weight faces the rotor in the motor chamber, so that the refrigerant, which flows toward the suction passage through the introduction passage, may hit the balance weight. This increases pressure drop in the refrigerant drawn into the compression chamber from the introduction passage through the suction passage, thereby decreasing the operating efficiency of the compressor. However, the rotor is disposed in the stator, so that the refrigerant that flows through the introduction passage is unlikely to contact and cool the stator suitably. Accordingly, such a compressor cannot fully solve a decrease in the durability of the compressor that may be caused by heat generation.

The present disclosure, which has been made in light of the above-mentioned problem, is directed to providing an electric compressor that is compact and has excellent durability and operating efficiency.

SUMMARY

In accordance with one aspect of the present disclosure, there is provided an electric compressor that includes a housing, a drive shaft, a motor, a fixed scroll, a movable scroll, and a fixed block. The drive shaft is disposed in the housing and rotatable around an axis of the drive shaft. The motor is disposed in the housing and configured to rotate the drive shaft. The fixed scroll is fixed to and disposed in the housing. The movable scroll is disposed in the housing and connected to the drive shaft. The movable scroll is revolved by rotation of the drive shaft. The compression chamber that compresses refrigerant is formed between the movable scroll and the fixed scroll. The fixed block is fixed to the housing and disposed between the motor and the movable scroll. The fixed block supports the drive shaft such that the drive shaft is rotatable. The fixed block defines a motor chamber in the housing to accommodate the motor. The housing has an inlet through which refrigerant is drawn into the motor chamber. The motor includes a stator that is fixed in the motor chamber and a rotor that is fixed to the drive shaft, disposed in the stator, and rotatable together with the drive shaft. The rotor has an introduction passage that is formed through the rotor in an axial direction of the drive shaft. Refrigerant flows through the introduction passage. The drive shaft includes a balance weight that is disposed between the fixed block and the motor. The balance weight extends to a position where the balance weight covers at least a part of the introduction passage in a radial direction of the drive shaft in a view in the axial direction of the drive shaft. The introduction passage includes a first passage that is located outward of the balance weight in a circumferential direction of the rotor and the drive shaft, and a second passage that faces the balance weight in the axial direction of the drive shaft.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof, may best be understood by reference to the following description of the presently preferred embodiments together with the accompanying drawings in which:

FIG. 5 is a front view of a rotor, a drive shaft, and a balance weight of a compressor according to a second embodiment, similar to FIG. 4.

DETAILED DESCRIPTION OF THE EMBODIMENTS

The following will describe a first embodiment and a second embodiment of the present disclosure in detail with reference to the accompanying drawings. Electric compressors according to the first embodiment and the second embodiment are, specifically, electric scroll compressors. These scroll compressors are mounted in a vehicle (not illustrated) and included in a refrigerant circuit of the vehicle.

First Embodiment

Figure 1:
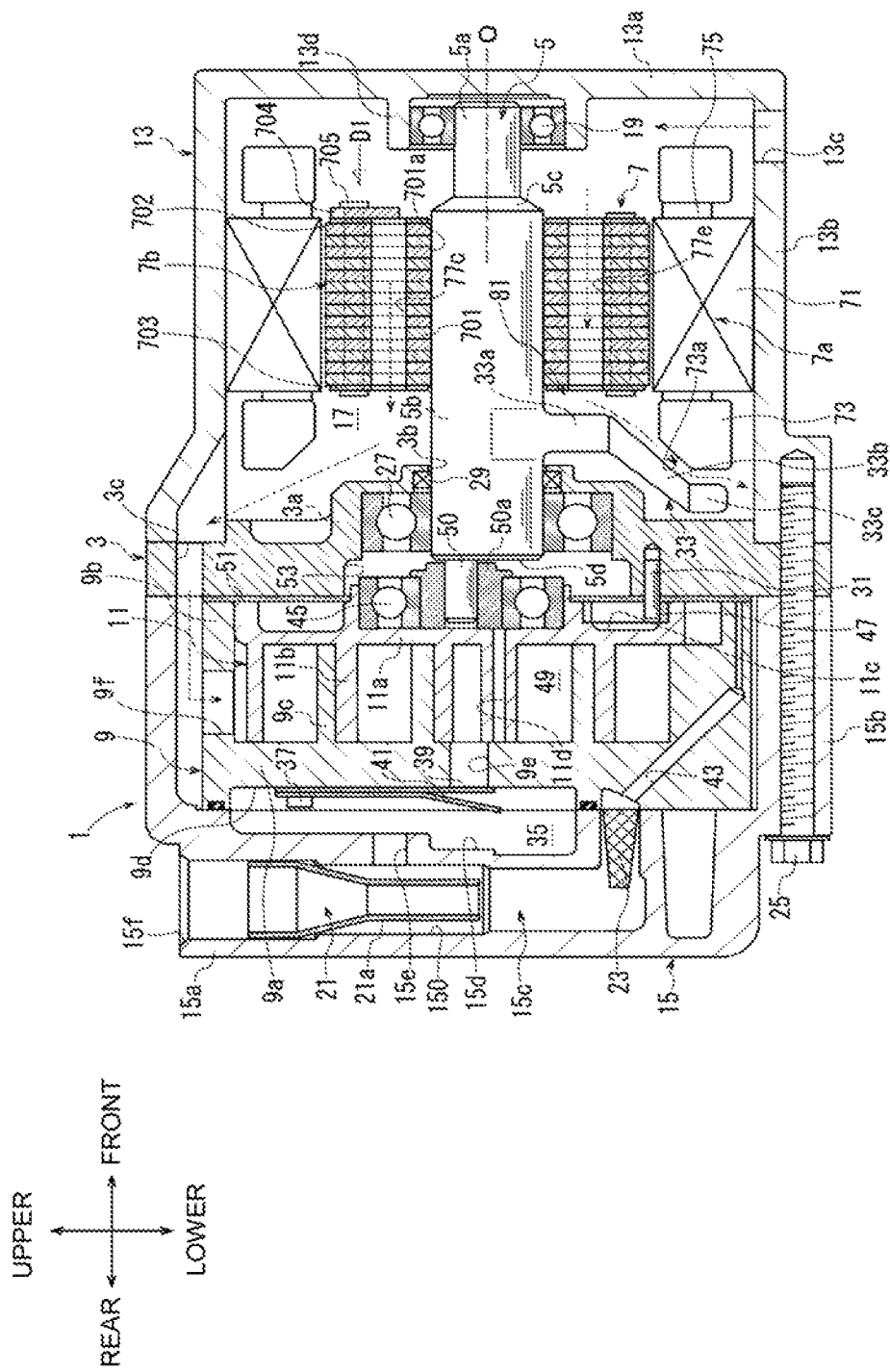
FIG. 1 is a sectional view of a compressor according to a first embodiment.

As illustrated in FIG. 1, the compressor according to the first embodiment includes a housing 1, a fixed block 3, a drive shaft 5, a motor 7, a fixed scroll 9, and a movable scroll 11. The housing 1 includes a motor housing 13 and a compressor housing 15. FIG. 1 illustrates the drive shaft 5, the motor 7, and the like in a simplified shape for the sake of explanation. The same is true in FIG. 3 that will be described later.

Figure 2:
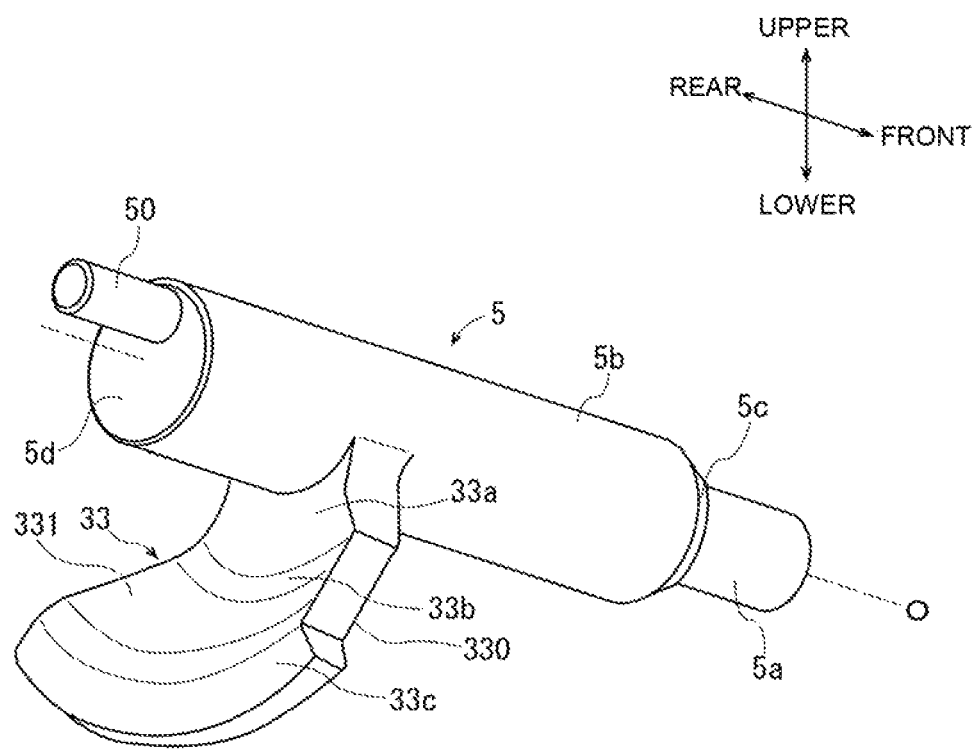
FIG. 2 is a perspective view of a drive shaft and a balance weight of the compressor according to the first embodiment.

As illustrated in FIG. 1, in the present embodiment, the front-rear direction of the compressor is defined by referring to the side on which the motor housing 13 is positioned as the front side of the compressor and referring to the side on which the compressor housing 15 is positioned as the rear side of the compressor. Further, the up-down direction of the compressor is defined by referring to the top of FIG. 1 as the upper side of the compressor and referring to the bottom of FIG. 1 as the lower side of the compressor. In FIG. 2 and thereafter, the front-rear direction and the up-down direction are indicated so as to correspond to those in FIG. 1. The front-rear direction and the like in the embodiment are merely examples, and the compressor of the present disclosure may be mounted appropriately in various postures depending on the vehicle on which the compressor is mounted.

The motor housing 13 includes a front wall 13a and a first peripheral wall 13b. The front wall 13a is located at a front end of the motor housing 13, i.e., at a front end of the housing 1, and extends in a radial direction of the motor housing 13. The first peripheral wall 13b is connected to the front wall 13a, and extends rearward from the front wall 13a in a direction of an axis O of the drive shaft 5 (i.e., an axial direction of the drive shaft 5). The front wall 13a and the first peripheral wall 13b cooperate to form the bottomed-cylindrical motor housing 13. Further, the front wall 13a and the first peripheral wall 13b cooperate to define a motor chamber 17 in the motor housing 13. The axis O is parallel to the front-rear direction of the compressor.

The motor housing 13 has an inlet 13c and a support part 13d. The inlet 13c is formed in a front portion of the first peripheral wall 13b, and communicates with the inside of the motor housing 13, i.e., the motor chamber 17, which will be described later. The inlet 13c is connected to an evaporator (not illustrated) via piping (not illustrated). The support part 13d projects from the front wall 13a into the motor housing 13. The support part 13d has a cylindrical shape, and a first radial bearing 19 is disposed in the support part 13d. The inlet 13c may be formed in the front wall 13a.

The compressor housing 15 includes a rear wall 15a and a second peripheral wall 15b. The rear wall 15a is located at a rear end of the compressor housing 15, i.e., at a rear end of the housing 1, and extends in a radial direction of the compressor housing 15. The second peripheral wall 15b is connected to the rear wall 15a and extends frontward from the rear wall 15a in the direction of the axis O. The rear wall 15a and the second peripheral wall 15b cooperate to form the bottomed-cylindrical compressor housing 15.

The compressor housing 15 has an oil separating chamber 15c, a first recess 15d, a discharge passage 15e, and an outlet 15f. The oil separating chamber 15c is located on a rear side in the compressor housing 15, and extends in the radial direction of the compressor housing 15. The first recess 15d is formed within the compressor housing 15 and in front of the oil separating chamber 15c, and is depressed toward the oil separating chamber 15c. The discharge passage is formed within the compressor housing 15 and extends in the direction of the axis O to be connected to the oil separating chamber 15c and the first recess 15d. The outlet 15f communicates with a top end of the oil separating chamber 15c and is opened to the outside of the compressor housing 15. The outlet 15f is connected to a condenser (not illustrated) via piping (not illustrated).

The oil separating chamber 15c is fixed to an oil separating cylinder 21. The oil separating cylinder 21 has an outer peripheral surface 21a that forms a cylindrical shape. The outer peripheral surface 21a is coaxial with an inner peripheral surface 150 of the oil separating chamber 15c. The outer peripheral surface 21a and the inner peripheral surface 150 cooperate to form a separator. A filter 23 is disposed below the oil separating cylinder 21 in the oil separating chamber 15c.

Figure 3:
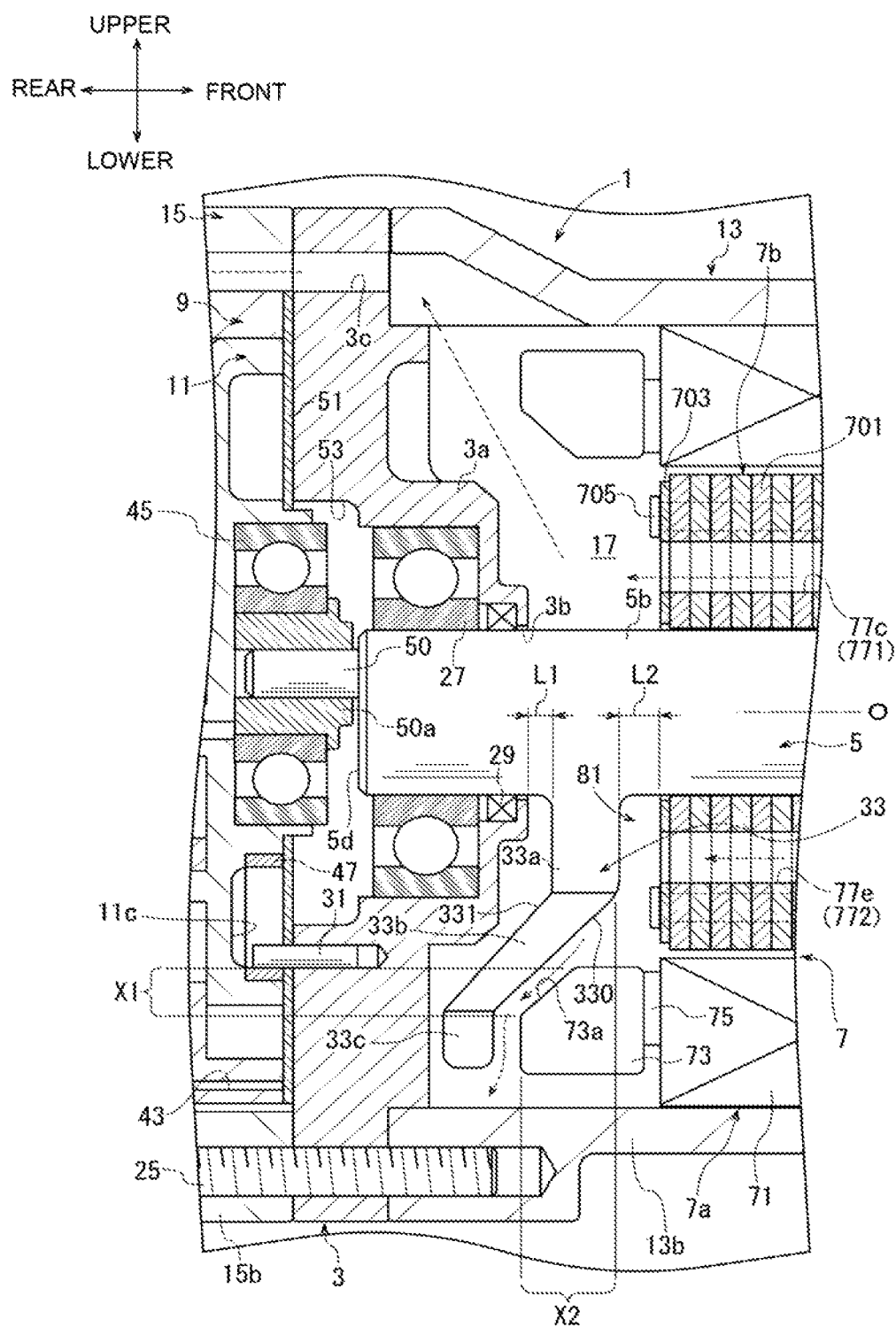
FIG. 3 is an enlarged sectional view of the compressor according to the first embodiment, illustrating a main part of the compressor, such as the balance weight and a stator.

The fixed block 3 is disposed between the motor housing 13 and the compressor housing 15. The motor housing 13, the compressor housing 15, and the fixed block 3 are tightened with a plurality of bolts 25 from the compressor housing 15 side. In this way, the fixed block 3 is held between the motor housing 13 and the compressor housing 15, and fixed to the motor housing 13 and the compressor housing 15, i.e., the housing 1. Accordingly, the fixed block 3 is fixed to the housing 1 and disposed between the motor 7 and the movable scroll 11 in the housing 1. FIGS. 1 and 3 illustrate only one of the bolts 25. A method for fixing the fixed block 3 to the housing 1 is determined as necessary.

Since the fixed block 3 is fixed to the housing 1, the fixed block 3 cooperates with the front wall 13a and the first peripheral wall 13b of the motor housing 13 to define the motor chamber 17 in the housing 1. That is, the motor chamber 17 is located within the motor housing 13 and communicates with the inlet 13c. The refrigerant is drawn from the evaporator into the motor chamber 17 through the inlet 13c. In this compressor, the motor chamber 17 also serves as a suction chamber.

The fixed block 3 includes a boss 3a that projects into the motor chamber 17 and therefore toward the motor 7. The boss 3a has an insertion hole 3b at a top end of the boss 3a. A second radial bearing 27 and a sealing member 29 are disposed in the boss 3a. The boss 3a has an outer diameter that is smaller than an inner diameter of a plurality of coil ends 73, which will be described later. A plurality of anti-rotation pins 31 is fixed to a rear side of the fixed block 3. The anti-rotation pins 31 extend rearward from the fixed block 3. FIGS. 1 and 3 illustrate only one of the anti-rotation pins 31.

The fixed block 3 further has a suction passage 3c. The suction passage 3c is formed through the fixed block 3 in the front-rear direction, i.e., in the direction of the axis O. The suction passage 3c allows the motor chamber 17 to communicate with the inside of the compressor housing 15 through the suction passage 3c. The suction passage 3c is formed in the fixed block 3 at a position outward of the motor 7, specifically, located outward of a stator 7a, in the radial direction of the drive shaft 5.

As illustrated in FIG. 2, the drive shaft 5 has a cylindrical shape and extends in the direction of the axis O. The drive shaft 5 includes a small-diameter portion 5a, a large-diameter portion 5b, and a taper portion 5c. The small-diameter portion 5a forms a frond end portion of the drive shaft 5. The large-diameter portion 5b is located behind the small-diameter portion 5a. The large-diameter portion 5b has a diameter greater than that of the small-diameter portion 5a. The large-diameter portion 5b has a flat rear end face 5d at a rear end of the large-diameter portion 5b. The taper portion 5c is located between the small-diameter portion 5a and the large-diameter portion 5b. The taper portion 5c is connected to the small-diameter portion 5a at a front end of the taper portion 5c. The taper portion 5c increases its diameter as the taper portion 5c extends rearward, and is connected to the large-diameter portion 5b at a rear end of the taper portion 5c.

Further, an eccentric pin 50 is fixed to the large-diameter portion 5b. The eccentric pin 50 is located on the rear end face 5d at a position eccentric from the axis O. The eccentric pin 50 has a cylindrical shape and a diameter smaller than that of the drive shaft 5, and extends rearward from the rear end face 5d.

As illustrated in FIG. 1, the drive shaft 5 is disposed in the housing 1. The small-diameter portion 5a of the drive shaft 5 is rotatably supported by the support part 13d of the motor housing 13 via the first radial bearing 19. The rear end of the large-diameter portion 5b and the eccentric pin 50 are inserted into the boss 3a through the insertion hole 3b of the fixed block 3. The rear end of the large-diameter portion 5b is rotatably supported by the second radial bearing 27 in the boss 3a. The drive shat 5 is supported by the fixed block 3 such that the drive shaft 5 is rotatable around the axis O in the housing 1. The sealing member 29 seals a gap between the fixed block 3 and the drive shaft 5. The eccentric pin 50 is fitted in a bushing 50a in the boss 3a.

As illustrated in FIG. 2, the drive shaft 5 includes the balance weight 33 formed integrally with the large-diameter portion 5b. The balance weight 33 is located at a position eccentric from the axis O in the large-diameter portion 5b. Specifically, the balance weight 33 is located on a side opposite to the eccentric pin 50 with respect to the axis O.

The balance weight 33 has a plate-like and fan-like shape. The balance weight 33 extends away from the large-diameter portion 5b in the radial direction of the drive shaft 5, that is, extends from the large-diameter portion 5b toward the first peripheral wall 13b of the motor housing 13. The balance weight 33 has a proximal portion 33a, a middle portion 33b, and a distal portion 33c. As illustrated in FIG. 3, the proximal portion 33a is connected to the large-diameter portion 5b, and substantially vertically extends from the large-diameter portion 5b in the radial direction of the drive shaft 5. The middle portion 33b is connected to the proximal portion 33a. The middle portion 33b is gradually inclined rearward while extending from the proximal portion 33a in the radial direction of the drive shaft 5. The middle portion 33b has a front surface 330 and a rear surface 331. As in the shape of the middle portion 33b, the front surface 330 and the rear surface 331 are gradually inclined rearward while extending in the radial direction of the drive shaft 5. The distal portion 33c is connected to the middle portion 33b, and substantially vertically extends from the middle portion 33b in the radial direction of the drive shaft 5.

The drive shaft 5 is disposed in the housing 1, so that the balance weight 33 is located in the motor chamber 17. That is, the balance weight 33 is disposed in the motor chamber 17 and between the fixed block 3 and the motor 7. The balance weight 33, specifically, the proximal portion 33a is located away from the boss 3a of the fixed block 3 by a distance L1. Accordingly, the balance weight 33 is not in contact with the boss 3a in the motor chamber 17.

As illustrated in FIG. 1, the motor 7 is accommodated in the motor chamber 17 (disposed in the housing 1), and located in front of the balance weight 33. The motor 7 is configured to rotate the drive shaft 5. The motor 7 includes the stator 7a and a rotor 7b. The stator 7a is disposed radially outward of the rotor 7b, that is, located between the rotor 7b and an inner peripheral surface of the first peripheral wall 13b. The stator 7a is fixed to the inner peripheral surface of the first peripheral wall 13b. Accordingly, the stator 7a is fixed in the motor chamber 17. The motor 7 is connected, via the stator 7a, to an inverter (not illustrated) that is disposed outside the motor housing 13.

The stator 7a includes a stator core 71 and a coil 75 having the coil ends 73. In other words, the stator 7a includes the coil ends 73. The stator core 71 has a cylindrical shape. The stator core 71 is wrapped in the coil 75. The coil ends 73 protrude respectively from end faces of the stator core 71, i.e., a front end face and a rear end face of the stator core 71, in an axial direction of the stator core 71, and the coil ends 73 each have a ring shape. The coil ends 73 form a part of the coil 75. The outer diameter of the boss 3a is smaller than the inner diameter of each coil end 73, so that the rear coil end 73 covers the distal end of the boss 3a in the direction of the axis O of the drive shaft 5, i.e., an axial direction of the drive shaft 5, in the motor chamber 17.

As illustrated in FIG. 3, the coil end 73 has an inner peripheral surface 73a that faces the drive shaft 5. A rear part of the inner peripheral surface 73a, that is, the inner peripheral surface 73a of the rear coil end 73 on the fixed block 3 side, extends in a radial direction of the drive shaft 5 as the inner peripheral surface 73a approaches the fixed block 3. Specifically, the rear part of the inner peripheral surface 73a is inclined along the middle portion 33b of the balance weight 33 and away from the front surface 330 of the middle portion 33b and therefore the balance weight 33. Such a shape of the inner peripheral surface 73a prevents an interference between the middle portion 33b and the inner peripheral surface 73a, thus, an interference between the balance weight 33 and the coil end 73, in the motor chamber 17.

In this compressor, the balance weight 33 extends, in the radial direction of the drive shaft 5, from the drive shaft 5 toward the rear coil end 73 of the stator 7a beyond the rotor 7b, in the motor chamber 17. Accordingly, the middle portion 33b and the distal portion 33c of the balance weight 33 cooperate to cover a part of the rear coil end 73 in the radial direction and the axial direction of the drive shaft 5 in a view in the axial direction of the drive shaft 5. Specifically, the middle portion 33b covers the part of the inner peripheral surface 73a of the rear coil end 73 in the radial direction of the drive shaft 5 in a first region X1 and in the axial direction of the drive shaft 5 in a second region X2.

As illustrated in FIG. 1, the rotor 7b is disposed in the stator 7a. The rotor 7b includes a rotor body 701, a first retaining plate 702, a second retaining plate 703, a rotor weight 704, a plurality of coupling pins 705, and a plurality of magnet cores (not illustrated).

The rotor body 701 is made from approximately-ring-shaped steel sheets laminated on top of each other in the direction of the axis O. The rotor body 701, i.e., steel sheets, has a shaft hole 701a through which the drive shaft 5 is inserted. Accordingly, the rotor body 701 has an approximately cylindrical shape and extends in the direction of the axis O. The magnet cores are disposed in the rotor body 701.

Figure 4:
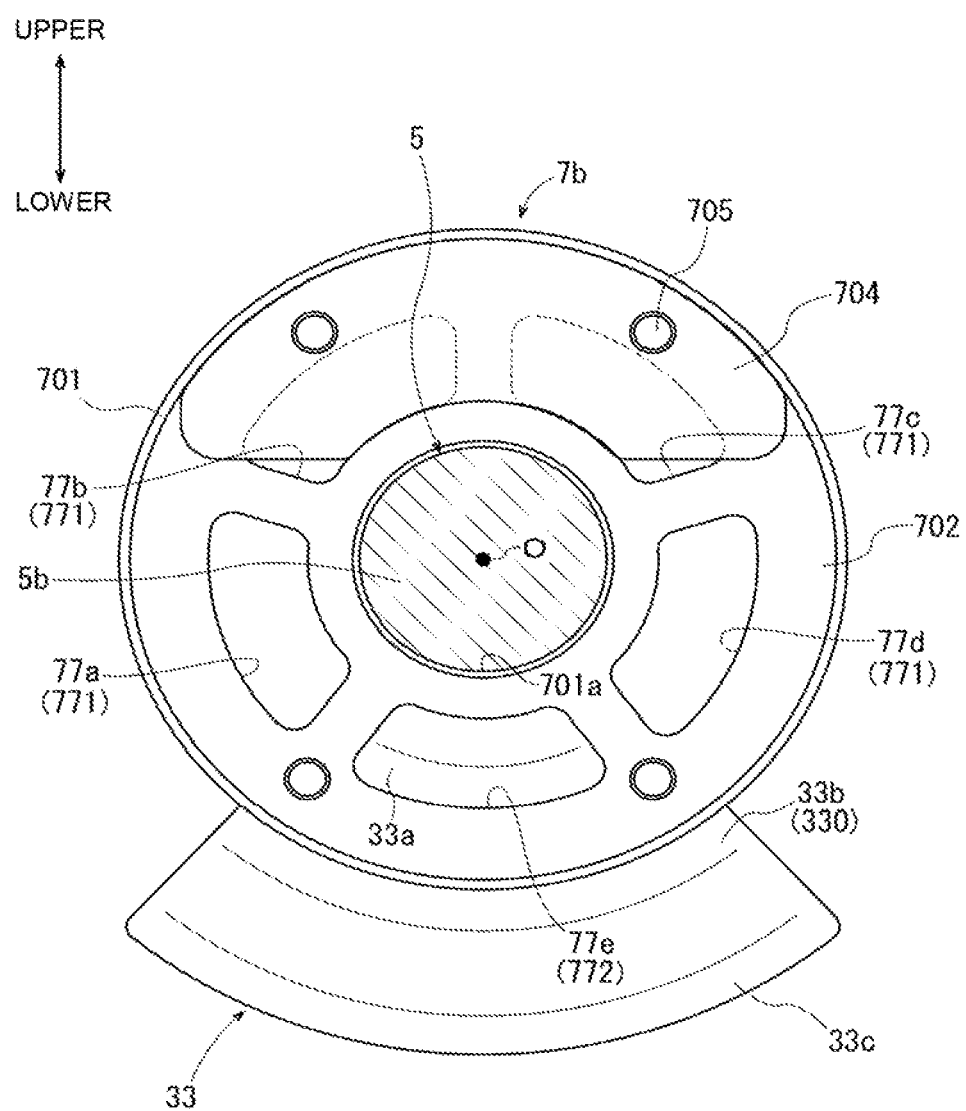
FIG. 4 is a front view of a rotor, the drive shaft, and the balance weight of the compressor according to the first embodiment when viewed in a direction D1 in FIG. 1.

The first retaining plate 702 and the second retaining plate 703 each have a disc shape and are made from a metal plate. The first retaining plate 702 is located on a front portion of the rotor body 701. The second retaining plate 703 is located on a rear portion of the rotor body 701. As illustrated in FIG. 4, the rotor weight 704 has an approximately semi-circular shape and is made from a metal plate. As illustrated in FIG. 1, the rotor weight 704 has a thickness greater than that of the first retaining plate 702 and that of the second retaining plate 703. The shape and the thickness of the rotor weight 704 may be determined as necessary.

The rotor weight 704, the first retaining plate 702, the rotor body 701, and the second retaining plate 703 are arranged in this order from the front side in the direction of the axis O to form the rotor 7b. The coupling pins 705 are inserted through the rotor weight 704, the first retaining plate 702, the rotor body 701, and the second retaining plate 703. Each of the coupling pins 705 is swaged at a front end and a rear end of the coupling pin 705, so that the rotor body 701 is fixed to the first retaining plate 702 and the second retaining plate 703 and held between the first retaining plate 702 and the second retaining plate 703. The rotor weight 704 is fixed to a front surface of the first retaining plate 702. A method for fixing the rotor body 701, the first retaining plate 702, the second retaining plate 703 and the rotor weight 704 with the coupling pins 705 is determined as necessary.

The rotor 7b has first to fifth introduction passages 77a-77e. The first to fifth introduction passages 77a-77e each serve as an introduction passage of the present disclosure. The first to fifth introduction passages 77a-77e extend from the first retaining plate 702 to the second retaining plate 703 through the rotor body 701, that is, from the inlet 13c side to the fixed block 3 side, in the direction of the axis O. That is, the first to fifth introduction passages 77a-77e are formed through the rotor 7b in the direction of the axis O, i.e., the axial direction of the drive shaft 5. The first to fifth introduction passages 77a-77e have the same fan-like shape. The shape and quantity of the first to fifth introduction passages 77a-77e are determined as necessary.

The first to fifth introduction passages 77a-77e are equiangularly arranged in a circumferential direction of the rotor 7b. The rotor weight 704 is fixed to the front surface of the first retaining plate 702, so that the second introduction passage 77b and the third introduction passage 77c among the first to fifth introduction passages 77a-77e face the rotor weight 704. Accordingly, front ends of the second introduction passage 77b and the third introduction passage 77c are mostly covered by the rotor weight 704, although not completely closed. In contrast, the first introduction passage 77a, the fourth introduction passage 77d, and the fifth introduction passage 77e are shifted relative to the rotor weight 704 in the circumferential direction of the rotor 7b.

In this compressor, the large-diameter portion 5b of the drive shaft 5 is fitted in the shaft hole 701a of the rotor body 701 by shrink-fitting, so that the rotor 7b is fixed to the drive shaft 5. The position of the rotor 7b is determined relative to the drive shaft 5 such that the rotor weight 704 is positioned on the side opposite to the balance weight 33 with respect to the axis O. The rotor 7b may be fixed to the drive shaft 5 by means, such as key joint.

The rotor 7b rotates in the stator 7a, so that the drive shaft 5 rotates together with the rotor 7b around the axis O in the motor chamber 17 since the rotor 7b is fixed to the drive shaft 5 in this compressor.

Further, fixing the rotor 7b to the drive shaft 5 causes the balance weight 33 to be positioned behind the rotor 7b. As illustrated in FIG. 3, the rotor 7b is fixed to the drive shaft 5 with a space 81 formed between the balance weight 33 and the rotor 7b. The presence of the space 81 causes the balance weight 33, specifically, the proximal portion 33a, to be rearward away from the rotor 7b in the axial direction of the drive shaft 5 by a distance L2. Accordingly, the balance weight 33 is not in contact with the rotor 7b. The distance L2 is longer than the distance L1 between the boss 3a of the fixed block 3 and the balance weight 33. The middle portion 33b of the balance weight 33 is gradually inclined rearward as the middle portion 33b extends in the radial direction of the drive shaft 5, so that the middle portion 33b and the distal portion 33c are more rearward away from the rotor 7b by a distance longer than the distance L2. When the rotor 7b is fixed to the drive shaft 5, the length of the distance L2, i.e., the size of the space 81 may be determined as necessary as long as the balance weight 33 is not in contact with the rotor 7b.

As illustrated in FIG. 4, in this compressor, the balance weight 33 is disposed between the first introduction passage 77a and the fourth introduction passage 77d when the rotor 7b is fixed to the drive shaft 5. The drive shaft 5 rotates together with the rotor 7b around the axis O as described above. Accordingly, the first to fourth introduction passages 77a-77d are located constantly outward of the balance weight 33 in the circumferential direction of the rotor 7b and the drive shaft 5, i.e., the rotation direction of the rotor 7b and the drive shaft 5. The balance weight 33, specifically, the proximal portion 33a of the balance weight 33, constantly faces the fifth introduction passage 77e in the axial direction of the drive shaft 5. Since the space 81 is formed between the balance weight 33 and the rotor 7b, the balance weight 33 is located away from the first to fifth introduction passages 77a-77e by the distance L2 in the axial direction of the drive shaft 5.

Among the first to fifth introduction passages 77a-77e formed in this compressor, each of the first to fourth introduction passages 77a-77d consists of a first passage 771 only that is constantly located outward of the balance weight 33 in the circumferential direction of the rotor 7b and the drive shaft 5. In contrast, the fifth introduction passage 77e consists of a second passage 772 only that faces the balance weight 33 in the axial direction of the drive shaft 5. Accordingly, in this embodiment, this compressor has four first passages 771 and one second passage 772. That is, the first to fifth introduction passages 77a-77e include the first passages 771 and the second passage 772. The sum of the flow passage sectional areas of the first to fourth introduction passages 77a-77d forms the total flow passage sectional area of the first passages 771, and the flow passage sectional area of the fifth introduction passage 77e forms the flow passage sectional area of the second passage 772. The first to fifth introduction passages 77a-77e have the same shape, so that the total flow passage sectional area of the first passages 771 is greater than the flow passage sectional area of the second passage 772 in this compressor.

As illustrated in FIG. 1, the fixed scroll 9 is fixed to the compressor housing 15 and accommodated in the compressor housing 15. The fixed scroll 9 includes a fixed base plate 9a, a fixed peripheral wall 9b, and a fixed scroll wall 9c. The fixed base plate 9a is located at a rear end of the fixed scroll 9 and has a disc shape. The fixed base plate 9a has a second recess 9d and a discharge port 9e. The second recess 9d is formed in a rear surface of the fixed base plate 9a and depressed frontward. The second recess 9d faces the first recess 15d since the fixed scroll 9 is fixed to the compressor housing 15. The first recess 15d and the second recess 9d cooperate to form the discharge chamber 35. The discharge chamber 35 communicates with the oil separating chamber 15c through the discharge passage 15e. The discharge port 9e extends through the fixed base plate 9a in the direction of the axis O to communicate with the second recess 9d and therefore the discharge chamber 35.

A discharge reed valve 39 and a retainer 41 are attached to the fixed base plate 9a with a pin 37. The pin 37, the discharge reed valve 39, and the retainer 41 are disposed in the discharge chamber 35. The discharge reed valve 39 elastically deforms to open and close the discharge port 9e. The retainer 41 regulates the deformation amount of the discharge reed valve 39.

The fixed peripheral wall 9b is connected to the outer periphery of the fixed base plate 9a and cylindrically extends frontward. The fixed peripheral wall 9b has a communication hole 9f. The communication hole 9f is formed through the fixed peripheral wall 9b in a radial direction of the fixed scroll 9, and is opened to the compressor housing 15. The fixed scroll wall 9c extends from a front surface of the fixed base plate 9a. The fixed scroll wall 9c is arranged radially inward of the fixed peripheral wall 9b and formed integrally with the fixed peripheral wall 9b.

The fixed scroll 9 has an oil supply passage 43. The oil supply passage 43 penetrates the fixed base plate 9a and the fixed peripheral wall 9b. The oil supply passage 43 opens on the rear surface of the fixed base plate 9a and a front end surface of the fixed peripheral wall 9b respectively at a rear end and a front end of the oil supply passage 43. The oil supply passage 43 communicates with the oil separating chamber 15c through the filter 23. The shape of the oil supply passage 43 may be determined as necessary.

The movable scroll 11 is disposed in the compressor housing 15 and is located between the fixed scroll 9 and the fixed block 3. The movable scroll 11 includes a movable base plate 11a and a movable scroll wall 11b. The movable base plate 11a is located at a front end of the movable scroll 11 and has a disc shape. The movable base plate 11a supports the bushing 50a via a third radial bearing 45 such that the bushing 50a is rotatable. Accordingly, the movable scroll 11 is connected to the drive shaft 5 via the bushing 50a and the eccentric pin 50 at a position eccentric from the axis O.

The movable base plate 11a has anti-rotation holes 11c in which distal ends of the anti-rotation pins 31 are loosely fitted. Rings 47 each having a cylindrical shape are loosely fitted in the anti-rotation holes 11c.

The movable scroll wall 11b extends from a front surface of the movable base plate 11a toward the fixed base plate 9a. The movable scroll wall 11b has, in a vicinity of the center of the movable scroll wall 11b, a supply hole 11d that is opened at a front end of the movable scroll wall 11b and extends in the front-rear direction to penetrate the movable scroll wall 11b and the movable base plate 11a.

The fixed scroll 9 and the movable scroll 11 mesh with each other. Accordingly, a compression chamber 49 is formed between the fixed scroll 9 and the movable scroll 11 and defined by the fixed base plate 9a, the fixed scroll wall 9c, the movable base plate 11a, and the movable scroll wall 11b. The compression chamber 49 is configured to communicate with the inside of the compressor housing 15 and therefore the suction passage 3c through the communication hole 9f of the fixed peripheral wall 9b. The compression chamber 49 communicates with the discharge port 9e.

An elastic plate 51 is disposed between the fixed block 3 and the fixed scroll 9 and the movable scroll 11. The fixed scroll 9 and the movable scroll 11 are in contact with the fixed block 3 via the elastic plate 51. The elastic plate 51 is made from a thin metal sheet. The movable scroll 11 is urged toward the fixed scroll 9 by the elastic restoring force of the elastic plate 51.

The movable base plate 11a and the elastic plate 51 cooperate to form a back-pressure chamber 53 in the boss 3a of the fixed block 3. The back-pressure chamber 53 communicates with the supply hole 11d.

In the compressor having such a configuration, refrigerant at low temperature and low pressure is drawn from the evaporator into a front region in the motor chamber 17 through the inlet 13c as indicated by dashed arrows in FIGS. 1 and 3. The refrigerant then reaches a rear region in the motor chamber 17, that is, a region in the motor chamber 17 on the fixed block 3 side through the first to fifth introduction passages 77a-77e of the rotor 7b, and further flows through the suction passage 3c of the fixed block 3 from the motor chamber 17. The motor 7 operates while being controlled by the inverter, so that the rotor 7b rotates around the axis O. Accordingly, the drive shaft 5 rotates around the axis O, and the rotation of the drive shaft 5 revolves the movable scroll 11. This allows the movable base plate 11a to slide on a distal end of the fixed scroll wall 9c, and the fixed scroll wall 9c and the movable scroll wall 11b to slide on each other. At this time, each anti-rotation pin 31 rotates in the ring 47 and slides on an inner peripheral surface of the ring 47, which allows orbital motion of the movable scroll 11 while restraining rotation motion of the movable scroll 11. The orbital motion of the movable scroll 11 allows the refrigerant to flow from the suction passage 3c into the compressor housing 15 and further flow into the compression chamber 49 through the communication hole 9f. Accordingly, the orbital motion of the movable scroll 11 decreases the volume of the compression chamber 49, and the compression chamber 49 therefore compresses the refrigerant therein.

In this compressor, the orbital motion of the movable scroll 11 causes the supply hole 11d to slightly open to the compression chamber 49. The refrigerant at high pressure in the compression chamber 49 partly flows into the back-pressure chamber 53 through the supply hole 11d, so that a pressure in the back-pressure chamber 53 becomes high. Accordingly, in this compressor, the movable scroll 11 is urged toward the fixed scroll 9 by the elastic plate 51 and the pressure in the back-pressure chamber 53 and seals the compression chamber 49 suitably.

The refrigerant highly compressed in the compression chamber 49 is discharged from the discharge port 9e into the discharge chamber 35, and flows from the discharge chamber 35 to the oil separating chamber 15c through the discharge passage 15e. The highly-compressed refrigerant is separated from lubricant oil while the refrigerant spirals between the outer peripheral surface 21a of the oil separating cylinder 21 and the inner peripheral surface 150 of the oil separating chamber 15c, and the refrigerant separated from the lubricant oil flows through the inside of the oil separating cylinder 21 and is discharged from the outlet 15f.

In contrast, the lubricant oil separated from the refrigerant is retained in the oil separating chamber 15c. The lubricant oil flows through the oil supply passage 43 via the filter 23, and is supplied to a sliding point between the fixed scroll 9 and the movable scroll 11 for lubricating the sliding point. The lubricant oil is also supplied between the second radial bearing 27 and the drive shaft 5, and supplied to the motor chamber 17, through the oil supply passage 43.

In this compressor, the movable scroll 11 is connected to the drive shaft 5 via the eccentric pin 50 and the bushing 50s. While the compressor is in operation, the drive shaft 5 receives centrifugal force generated by the orbital motion of the movable scroll 11. The drive shaft 5 with the balance weight 33 also receives centrifugal force generated by the balance weight 33 while the compressor is in operation. The drive shaft 5 is fixed to the rotor 7b, and the rotor 7b includes the rotor weight 704. This configuration causes the drive shaft 5 to further receive centrifugal force generated by the rotor weight 704 via the rotor 7b while the compressor is in operation. In this way, in this compressor, the centrifugal force by the balance weight 33 and the centrifugal force by the rotor weight 704 cooperate to appropriately cancel the centrifugal force applied by the movable scroll 11 to the drive shaft 5. Therefore, this compressor is capable of reducing runout of the drive shaft 5 in the radial direction of the drive shaft 5 while the compressor is in operation.

Further, in this compressor, the first to fifth introduction passages 77a-77e are formed in the rotor 7b. This configuration eliminates the need for a space for the first to fifth introduction passages 77a-77e outward of the stator 7a in the motor chamber 17. This configuration of the compressor therefore allows the motor housing 13 to be compact.

Further, in this compressor, the balance weight 33 is disposed between the fixed block 3 and the rotor 7b (motor 7) in the motor chamber 17. Among the first to fifth introduction passages 77a-77e formed in the rotor 7b, the first to fourth introduction passages 77a-77d are constantly located outward of the balance weight 33 in the circumferential direction of the rotor 7b and the drive shaft 5, and the fifth introduction passage 77e constantly faces the balance weight 33.

Accordingly, the refrigerant, which has flowed through the first passages 771, i.e., the first to fourth introduction passages 77a-77d, reaches the suction passage 3c from the motor chamber 17 without hitting the balance weight 33. The refrigerant is then drawn into the compression chamber 49 through the suction passage 3c. That is, the refrigerant flowed through the first passages 771 is drawn into the compression chamber 49 without a pressure drop that may be caused by collision of the refrigerant with the balance weight 33. The front ends of the second introduction passage 77b and the third introduction passage 77c are mostly covered by the rotor weight 704. Accordingly, flow resistance of the refrigerant is larger in the second introduction passage 77b and the third introduction passage 77c than that in the first introduction passage 77a and the fourth introduction passage 77d. As a result, the refrigerant flowed through the second introduction passage 77b and the third introduction passage 77c does not cause a pressure drop due to a collision with the balance weight 33, but causes a pressure drop greater than that in the refrigerant flowed through the first introduction passage 77a and the fourth introduction passage 77d.

The refrigerant, which has flowed through the second passage 772, i.e., the fifth introduction passage 77e, hits the proximal portion 33a of the balance weight 33, so that the refrigerant flows toward an outer region in the motor chamber 17 in the radial direction of the drive shaft 5, that is, flows toward the stator 7a. This allows the refrigerant flowed through the second passage 772 to cool the stator 7a including the rear coil end 73 suitably in this compressor.

In this compressor, the rotation of the drive shaft 5 rotates the balance weight 33 together with the drive shaft 5 in the motor chamber 17. The refrigerant, which has flowed through the fifth introduction passage 77e and cooled the stator 7a, is stirred by the balance weight 33 in the motor chamber 17. Accordingly, the refrigerant flowed through the fifth introduction passage 77e is mixed into the refrigerant flowed through the first to fourth introduction passages 77a-77d by the stirring in the motor chamber 17. Stirring by the balance weight 33 causes the refrigerant flowed through the first to fifth introduction passages 77a-77e to flow in the motor chamber 17 toward a region outward of the stator 7a, i.e., outward of the motor 7, and then to reach the compression chamber 49 through the suction passage 3c (indicated by a dashed arrow in FIG. 1).

Accordingly, the pressure drop due to the collision of the refrigerant with the balance weight 33 cannot be avoided in the refrigerant flowed through the fifth introduction passage 77e, but this compressor is capable of reducing the pressure drop in the whole refrigerant drawn into the compression chamber 49, which includes the refrigerant flowed through the first to fourth introduction passages 77a-77d.

Accordingly, the compressor according to the first embodiment is allowed to be compact and to have excellent durability and operating efficiency.

Particularly, in this compressor, the first to fourth introduction passages 77a-77d among the first to fifth introduction passages 77a-77e serve as the first passages 771. This eliminates the need for excessively increasing the sizes of the first to fourth introduction passages 77a-77d formed in the rotor 7b in order to increase the flow rate of the refrigerant that flows through the first passages 771. Therefore, this allows the rotor 7b and therefore the motor 7 to be compact, thereby allowing the compressor to be compact.

In this compressor, the presence of the four first passages 771 allows the total flow passage sectional area of the whole first passages 771 to be greater than the flow passage sectional area of the second passage 772. Accordingly, the flow rate of the refrigerant that flows through the first passages 771 is greater than the flow rate of the refrigerant that flows through the second passage 772. This allows suitable reduction of the pressure drop in the whole refrigerant drawn into the compression chamber 49.

Further, the presence of the space 81 formed between the balance weight 33 and the rotor 7b allows the rotor 7b, i.e., the fifth introduction passage 77e, to be located away from the proximal portion 33a of the balance weight 33 by the distance L2. Accordingly, although the proximal portion 33a and the fifth introduction passage 77e face each other in the axial direction of the drive shaft 5, the proximal portion 33a is unlikely to prevent the flow of the refrigerant in the fifth introduction passage 77e. Therefore, the refrigerant suitably flows through the fifth introduction passage 77e that serves as the second passage 772, as in the first to fourth introduction passages 77a-77d that serve as the first passages 771.

Particularly, in this compressor, the balance weight 33 extends in the radial direction of the drive shaft 5 to a position where the balance weight 33 covers, from the drive shaft 5 side, a part of the rear coil end 73 in the radial and axial directions of the drive shaft 5 in a view in the axial direction of the drive shaft 5. In this compressor, the coil end 73 of the stator 7a is likely to generate heat while the compressor is in operation, but the balance weight 33 suitably guides the refrigerant, which has flowed through the fifth introduction passage 77e, toward the coil end 73. The middle portion 33b of the balance weight 33 having the front surface 330 is gradually inclined rearward as the middle portion 33b extends from the proximal portion 33a in the radial direction of the drive shaft 5. This allows the balance weight 33 to suitably guide the refrigerant, which has flowed through the fifth introduction passage 77e, toward the coil end 73 in this compressor. In this compressor, the refrigerant that has flowed through the fifth introduction passage 77e suitably cools the coil end 73 and therefore the stator 7a.

The balance weight 33 extends in the radial direction of the drive shaft 5 to a position where the balance weight 33 covers in a view in the axial direction of the drive shaft 5, from the drive shaft 5 side, a part of the coil end 73 in the radial direction of the drive shaft 5, which allows the balance weight 33 to generate centrifugal force at a position sufficiently away from the axis O while the compressor is in operation. This configuration of the compressor allows an increase in the centrifugal force generated by the balance weight 33 while allowing reduction of the thickness of the balance weight 33 for weight reduction.

Further, since the balance weight 33 covers a part of the coil end 73 also in the axial direction of the drive shaft 5, the compressor according to the embodiment allows the balance weight 33 to be located as close to the rear coil end 73 in the axial direction of the drive shaft 5 as possible in the axial direction of the drive shaft while placing the balance weight 33 between the fixed block 3 and the motor 7 and securing the space 81 between the balance weight 33 and the rotor 7b. This configuration prevents an increase in size of the compressor in the axial direction, thereby allowing the compressor to be compact.

Further, in this compressor, the suction passage 3c formed in the fixed block 3 is located outward of the motor 7 in the radial direction of the drive shaft 5. This configuration allows the refrigerant, which has been stirred by the balance weight 33 and has flowed toward the outside of the motor 7, to flow into the suction passage 3c suitably. Therefore, this compressor is unlikely to cause a pressure drop in the refrigerant while the refrigerant flows from the motor chamber 17 to the suction passage 3c.

Second Embodiment

As illustrated in FIG. 5, a compressor according to a second embodiment includes the balance weight 33 that is larger than the balance weight 33 of the compressor according to the first embodiment in the circumferential direction of the drive shaft 5. Accordingly, in this compressor, the proximal portion 33a of the balance weight 33 constantly faces a part of the first introduction passage 77a and a part of the fourth introduction passage 77d in addition to the fifth introduction passage 77e when the rotor 7b is fixed to the drive shaft 5. As a result, in this compressor, a part of the first introduction passage 77a and a part of the fourth introduction passage 77d each enclosed by an imaginary line are located constantly outward of the balance weight 33 in the circumferential direction of the rotor 7b and the drive shaft 5, and each serve as the first passage 771. In contrast, the other part of the first introduction passage 77a and the other part of the fourth introduction passage 77d, which are not enclosed by the imaginary line, face the proximal portion 33a of the balance weight 33 and each serve as the second passage 772.

In this compressor, since the other part of the first introduction passage 77a and the other part of the fourth introduction passage 77d, in addition to the fifth introduction passage 77e, each serve as the second passage 772, this compressor according to the second embodiment has a large flow passage sectional area of the whole second passages 772 and a small flow passage sectional area of the whole first passages 771 as compared with those of the compressor according to the first embodiment, instead. This compressor according to the second embodiment also has the plurality of first passages 771 since the second and third introduction passages 77b, 77c serve as the first passages 771 in addition to the parts of the first and fourth introduction passages 77a, 77d each enclosed by the imaginary line. It is to be noted that, other components of the second embodiment are the same as those of the first embodiment, and components of the second embodiment that correspond to those of the first embodiment are designated by the same reference numerals and will not be further elaborated here.

This compressor includes the larger balance weight 33, so that the larger balance weight 33 causes a larger centrifugal force while the compressor is in operation as compared with the compressor according to the first embodiment. This configuration suitably reduces runout of the drive shaft 5 in the radial direction of the drive shaft 5 even when the fixed scroll 9 and the movable scroll 11 are increased in size and therefore the centrifugal force applied by the movable scroll 11 to the drive shaft 5 is increased.

Further, in this compressor, the other part of the first introduction passage 77a and the other part of the fourth introduction passage 77d each serve as the second passage 772, in addition to the fifth introduction passage 77e, so that the flow rate of the refrigerant that flows through the second passages 772 increases. Accordingly, in this compressor, a pressure drop is unavoidably increased in the whole refrigerant drawn into the compression chamber 49 as compared with the compressor according to the first embodiment. Instead, the refrigerant flowed through the second passages 772 sufficiently cools the coil end 73 and therefore the stator 7a. Other operations of this compressor are the same as those of the compressor according to the first embodiment.

Although the present disclosure has been described based on the first and second embodiments, the present disclosure is not limited to those embodiments, and may be modified within the scope of the present disclosure.

For example, in the compressor according to the first and the second embodiments, the balance weight 33 is formed integrally with the drive shaft 5. However, it is not limited to this configuration, and the balance weight 33 may be formed separately from the drive shaft 5, and may be fixed to the large-diameter portion 5b of the drive shaft 5 by press-fitting or with a screw so that the balance weight 33 is disposed on the drive shaft 5.

Further, in the compressor according to the first and the second embodiments, the balance weight 33 has a plate-like and fan-like shape. However, it is not limited to this configuration, and the shape of the balance weight 33, including the shapes of the proximal portion 33a, the middle portion 33b, and the distal portion 33c, may be determined as necessary depending on the magnitude of the centrifugal force generated by the orbital motion of the movable scroll 11.

In the compressor according to the first and the second embodiments, the balance weight 33 extends to the rear coil end 73 of the stator 7a in the radial direction of the drive shaft 5. However, it is not limited to this configuration, and the balance weight 33 just needs to extend to a position where the balance weight 33 covers at least a part of the fifth introduction passage 77e in the radial direction of the drive shaft 5 in a view in the axial direction of the drive shaft 5.

In the compressor according to the first and the second embodiments, the middle portion 33b of the balance weight 33 has a shape that is gradually inclined rearward as the middle portion 33b extends from the proximal portion 33a in the radial direction of the drive shaft 5. However, it is not limited to this configuration, and the middle portion 33b may have a shape that extends perpendicular to the radial direction of the drive shaft 5 from the proximal portion 33a and only the front surface 330 of the middle portion 33b may be gradually inclined rearward while extending in the radial direction of the drive shaft 5.

Further, in the compressor according to the first and the second embodiments, the balance weight 33 may include a guiding part, such as a fin or a groove, which guides the refrigerant toward the rear coil end 73.

Further, in the compressors according to the first and second embodiments, the first to fifth introduction passages 77a-77e have the same shape. However, it is not limited to this configuration, and the first passage 771 and 1o the second passage 772, which each consist of at least one of the first to fifth introduction passages 77a-77e, may have a different shape.

Further, the compressors according to the first and second embodiments may have a configuration from which the second and third introduction passages 77b, 77c are omitted and in which the first, fourth, and fifth introduction passages 77a, 77d, 77e are formed integrally with each other to form a single introduction passage, so that this single introduction passage may include the first passage 771 and the second passage 772.

In the compressor according to the first and the second embodiments, the suction passage 3c is formed in the fixed block 3, but it is not limited to this configuration, and the suction passage 3c may be formed in the motor housing 13 or the like. Alternatively, the compressors according to the first and second embodiments may have a configuration in which the fixed block 3 is fitted with an inner peripheral surface of the motor housing 13 with a partial clearance between the fixed block 3 and the inner peripheral surface of the motor housing 13 so that the clearance serves as the suction passage 3c. That is, the suction passage 3c may be formed between the motor housing 13 and the fixed block 3.

The present disclosure may be applicable to an air conditioning device for a vehicle and the like.

What is claimed is:

1. An electric compressor comprising:
a housing;
a drive shaft that is disposed in the housing and rotatable around an axis of the drive shaft;
a motor disposed in the housing and configured to rotate the drive shaft;
a fixed scroll fixed to and disposed in the housing;
a movable scroll disposed in the housing and connected to the drive shaft, the movable scroll being revolved by rotation of the drive shaft, wherein a compression chamber that compresses refrigerant is formed between the movable scroll and the fixed scroll; and
a fixed block fixed to the housing and disposed between the motor and the movable scroll, the fixed block supporting the drive shaft such that the drive shaft is rotatable, the fixed block defining a motor chamber in the housing to accommodate the motor, wherein
the housing has an inlet through which refrigerant is drawn into the motor chamber,
the motor includes a stator fixed in the motor chamber and a rotor fixed to the drive shaft, disposed in the stator, and rotatable together with the drive shaft,
the stator includes a stator core that has a cylindrical shape and a coil end that has a ring shape and extends from an end face of the stator core in an axial direction of the drive shaft,
the rotor has an introduction passage that is formed through the rotor in the axial direction of the drive shaft, wherein refrigerant flows through the introduction passage,
the drive shaft includes a balance weight that is disposed between the fixed block and the motor,
the balance weight has a proximal portion, a middle portion that is connected to the proximal portion and inclined toward the compression chamber while extending from the proximal portion in a radial direction of the drive shaft, and a distal portion that is connected to the inclined portion, wherein the middle portion is continuously inclined from a connection point with the proximal portion to a connection point with the distal portion,
the balance weight extends to a position where the balance weight covers a part of the coil end in the radial direction and the axial direction of the drive shaft and extends to a position where the balance weight covers at least a part of the introduction passage in the radial direction of the drive shaft in a view in the axial direction of the drive shaft,
the introduction passage includes a first passage that is located outward of the balance weight in a circumferential direction of the rotor and the drive shaft, and a second passage that faces the balance weight in the axial direction of the drive shaft,
the proximal portion of the balance weight extends straight from the drive shaft in the radial direction and faces the second passage in the axial direction of the drive shaft, and
the coil end has an inner peripheral surface that faces the drive shaft, and a part of the inner peripheral surface extends in the radial direction of the drive shaft and along the inclined portion of the balance weight as the inner peripheral surface approaches the fixed block.

2. The electric compressor according to claim 1, wherein the first passage comprises a plurality of the first passages.

3. The electric compressor according to claim 1, wherein a flow passage sectional area of the first passage is greater than a flow passage sectional area of the second passage.

* * * * *